(12) United States Patent
Lyu

(10) Patent No.: US 11,333,363 B2
(45) Date of Patent: May 17, 2022

(54) PRESSURE-TYPE ALCOHOL STOVE

(71) Applicant: Zhejiang Lufeng Outdoor Products Co., Ltd., Jinhua (CN)

(72) Inventor: Qiding Lyu, Jinhua (CN)

(73) Assignee: Zhejiang Lufeng Outdoor Products Co., Ltd., Jinhua (CN)

( * ) Notice: Subject to any disclaimer, the term of this patent is extended or adjusted under 35 U.S.C. 154(b) by 332 days.

(21) Appl. No.: 16/796,444

(22) Filed: Feb. 20, 2020

(65) Prior Publication Data

US 2020/0263878 A1 Aug. 20, 2020

(30) Foreign Application Priority Data

Feb. 20, 2019 (CN) .................... 201910125090.X

(51) Int. Cl.
| | |
|---|---|
| *F24C 5/20* | (2021.01) |
| *F23D 11/44* | (2006.01) |
| *F24C 5/18* | (2006.01) |
| *F23D 5/02* | (2006.01) |
| *F24C 5/16* | (2006.01) |
| *F23D 5/18* | (2006.01) |
| *F24C 1/16* | (2021.01) |

(52) U.S. Cl.
CPC ............. *F24C 5/20* (2013.01); *F23D 5/02* (2013.01); *F23D 5/18* (2013.01); *F23D 11/441* (2013.01); *F24C 5/16* (2013.01); *F24C 5/18* (2013.01); *F23D 2202/00* (2013.01); *F23D 2900/31022* (2021.05); *F23N 2221/04* (2020.01); *F24C 1/16* (2013.01)

(58) Field of Classification Search
CPC ...... F24C 5/20; F24C 5/18; F24C 5/02; F24C 5/14; F24C 5/16; F24C 1/16; F23D 11/441; F23D 11/443; F23D 5/02; F23D 5/18; F23D 2900/31022; F23D 2202/00; A47J 36/30; F23N 2221/04
USPC .......................................................... 126/43
IPC .......... F24C 5/20,5/18, 5/02, 5/16, 1/16; F23D 11/44, 5/02, 5/18; A47J 36/30
See application file for complete search history.

(56) References Cited

U.S. PATENT DOCUMENTS

| | | | | |
|---|---|---|---|---|
| 238,331 | A * | 3/1881 | Betts | ......................... F24C 5/20 |
| | | | | 126/49 |
| 500,765 | A * | 7/1893 | Heller | ...................... F24C 5/20 |
| | | | | 126/43 |
| 821,406 | A * | 5/1906 | Ernst | ........................ F24C 5/20 |
| | | | | 126/43 |

(Continued)

FOREIGN PATENT DOCUMENTS

| | | | |
|---|---|---|---|
| CN | 207962747 U | 10/2018 | |
| EP | 2101110 A1 * | 9/2009 | ............. A47J 36/26 |

*Primary Examiner* — Steven B McAllister
*Assistant Examiner* — Daniel E. Namay
(74) *Attorney, Agent, or Firm* — Schwegman Lundberg & Woessner, P.A.

(57) ABSTRACT

A pressure-type alcohol stove includes a stove body, an upper cover, a pre-heating pipe, and an automatic liquid-feeding device, wherein the upper cover is arranged on the stove body and is matched with the stove body to form a vaporization cavity, the pre-heating pipe penetrates through the upper cover and has a bottom end located in the stove body and a top end partially stretching out of the upper cover, a pre-heating cavity is formed around the pre-heating pipe, spirally-distributed spray holes are formed through the upper cover, air jet holes used for air jetting and pre-mixing are formed through an upper part of in the pre-heating pipe.

14 Claims, 3 Drawing Sheets

(56) References Cited

U.S. PATENT DOCUMENTS

| | | | | |
|---|---|---|---|---|
| 1,104,383 | A * | 7/1914 | Potter | A01G 13/06 |
| | | | | 431/341 |
| 1,389,614 | A * | 9/1921 | Ball | F23D 11/44 |
| | | | | 126/262 |
| 2,278,734 | A * | 4/1942 | Perry | F24C 5/20 |
| | | | | 362/171 |
| 2,300,105 | A * | 10/1942 | Colosimo | A01G 13/06 |
| | | | | 126/59.5 |
| 4,502,464 | A * | 3/1985 | Figueroa | F24B 1/024 |
| | | | | 110/251 |
| 4,544,348 | A * | 10/1985 | Boij | F23D 3/40 |
| | | | | 431/146 |
| 4,776,787 | A * | 10/1988 | Hsie | F23D 11/443 |
| | | | | 431/243 |
| 8,701,650 | B2 * | 4/2014 | Huggins | A47J 36/26 |
| | | | | 126/41 R |
| 9,506,656 | B2 * | 11/2016 | Gravel | F23D 5/045 |
| 9,879,854 | B2 * | 1/2018 | Masterson | F23D 5/04 |
| 10,077,898 | B2 * | 9/2018 | Gravel | F23K 5/10 |
| 10,203,116 | B2 * | 2/2019 | Kuhn | A47J 36/34 |
| 2010/0192933 | A1 * | 8/2010 | Andersson | F23Q 7/08 |
| | | | | 431/258 |
| 2015/0090246 | A1 * | 4/2015 | Gravel | F24C 5/20 |
| | | | | 126/43 |

* cited by examiner

PRESSURE-TYPE ALCOHOL STOVE

CROSS-REFERENCE TO RELATED APPLICATIONS

This Non-provisional application claims priority under 35 U.S.C. § 119(a) on Chinese Patent Application No(s). 201910125090.X filed on Feb. 20, 2019, the entire contents of which are hereby incorporated by reference.

BACKGROUND OF THE INVENTION

Technical Field

This invention relates to a technical field of alcohol stoves, in particular to a pressure-type alcohol stove.

Description of Related Art

Structurally, most existing alcohol stoves have a core which contains alcohol or solid alcohol that can be burned for use after being ignited, and are of a semi-open micro-pressure structure.

For instance, an Existing Patent Publication No. CN201820235940.2 discloses an alcohol stove adopting the following technical solution: the alcohol stove comprises an external frame used for supporting an object to be heated and an inner container received in the external frame, wherein the inner container is structurally annular and includes an external annular container shell, an internal annular container shell, and an annular cover plate; a vaporization cavity sealed by the annular cover plate is defined between the internal annular container shell and the external annular container shell, an alcohol channel communicated with the vaporization cavity is arranged at the bottom of the internal annular container shell, and the annular cover plate is formed with at least one air spray hole and is provided with at least one burning ring; and the burning rings are in turn arranged from inside to outside relative to the center axis of the internal annular liner shell, and each burning ring includes a plurality of air spray holes annularly formed relative to the central axis of the internal annular container shell.

However, this alcohol stove generally has the problems of poor burning effect, insufficient flame intensity, poor fire-gathering effect and the like, has a low speed in boiling water and heating food, and consequentially, the outdoor cooking experience is affected. Besides, the alcohol stove is not suitable for outdoor use due to its relatively complex structure, large size, and heavy weight.

BRIEF SUMMARY OF THE INVENTION

In order to overcome at least one deficiency of the prior art, this invention provides a pressure-type alcohol stove.

In order to achieve above-mentioned objectives, this invention provides the following technical solutions:

A pressure-type alcohol stove includes a stove body, an upper cover, a pre-heating pipe, and an automatic liquid-feeding device, wherein the upper cover is arranged on the stove body and is matched with the stove body to form a vaporization cavity, the pre-heating pipe penetrates through the upper cover and has a bottom end located in the stove body and a top end partially stretching out of the upper cover, a pre-heating cavity is formed around the pre-heating pipe, spirally-distributed spray holes are formed through the upper cover, air jet holes used for air jetting and pre-mixing are formed through an upper part of in the pre-heating pipe, alcohol guide holes are formed in a lower part of the pre-heating pipe, and the number of the air jet holes and alcohol guide holes is at least one.

The automatic liquid-feeding device includes two liquid level sensors, a controller, and an alcohol pump, wherein the two liquid level sensors and are vertically arranged on a side wall of the stove body with one above the other, the alcohol pump has a liquid inlet communicated with an alcohol bottle via a pipe, the alcohol pump has a liquid outlet communicated with a liquid inlet at the side wall of the stove body via a pipe, and the controller is electrically connected to the two liquid level sensors and the alcohol pump.

In some preferred embodiments, the two liquid level sensors and form high and low liquid level sensors used for inducing the alcohol level in the alcohol stove. When the alcohol level in the alcohol stove may be lower than the lowest level, a low liquid level sensor sends a signal to the controller, and the alcohol pump may be controlled by the controller to be started through an electromagnetic relay to pump alcohol from the alcohol bottle into the alcohol stove; and when the alcohol level in the alcohol stove may be maximized, the high liquid level sensor sends a signal to the controller, and the pump alcohol may be controlled by the controller to stop pumping the alcohol.

In some preferred embodiments, air jet holes may be arranged along a circumferential direction of the preheating pipe, and at least one circle of air jet holes may be circumferentially formed through the pre-heating pipe.

In some preferred embodiments, the middle of the upper cover may be recessed downward to form the pre-heating cavity used for containing alcohol.

In some preferred embodiments, a center of the upper cover protrudes upwards to be higher than the surface of the upper cover and to form a lug boss, a center of a top of the lug boss may be provided with a through hole, the lower end of the pre-heating pipe penetrates through the through hole to be fixedly connected to a bottom of the stove body, and the lug boss and a central recessed surface of the upper cover form the pre-heating cavity.

In some preferred embodiments, the air jet holes may be formed through the pre-heating pipe stretching out of the lug boss.

In some preferred embodiments, a protruding ferrule may be arranged at a position, corresponding to the pre-heating pipe, of a bottom of the stove body to fix the lower end of the pre-heating pipe.

In some preferred embodiments, the pre-heating cavity may be not limited to be annular, and may be polygonal, thus being convenient to use.

In some preferred embodiments, to avoid spilling the alcohol into the pre-heating cavity, a top of the lug boss may be higher than the highest external upper surface of the upper cover.

In some preferred embodiments, at least one spray hole may be formed through an external side wall of the pre-heating cavity and may be close to the upper surface of the upper cover.

In some preferred embodiments, a circle of spray holes may be circumferentially formed through an external side wall of the pre-heating cavity at equal intervals, openings of each of the spray holes all face the pre-heating pipe arranged at the center, and the spray holes have an angle which may be 8°-15° in the horizontal direction to spray whirlwind air.

In some preferred embodiments, a plurality of circles of spray holes may be circumferentially formed through an external side wall of the pre-heating cavity at equal intervals, and every two adjacent circles of spray holes may be staggered.

In some preferred embodiments, the stove body of the alcohol stove may be provided with a handle sleeved with a heat insulation sleeve, so that the alcohol stove can be conveniently carried by users.

In some preferred embodiments, a transparent observation window may be arranged in the wall of the stove body of the alcohol stove, so that the alcohol level in the stove body can be conveniently observed from the outside.

In some preferred embodiments, an alcohol filling port may be formed in the wall of the stove body of the alcohol stove and may be communicated with a filling pipe which has a top higher than that of the stove body of the alcohol stove.

In some preferred embodiments, a cover plate may be arranged at the top of the filling pipe.

In some preferred embodiments, the cover plate may be movably connected to the top of the filling pipe through a hinge pin structure, and such structure facilitates the opening and closing of the cover plate.

In some preferred embodiments, the cover plate may be made from rubber and has a shroud ring segment disposed at the top opening of the filling pipe, and such structure has good airtightness.

In some preferred embodiments, the stove body and the upper cover may be made of stainless steel, glass, or aluminum alloys, and the pre-heating pipe may be made of stainless steel, aluminum alloys, copper, or copper alloys.

In some preferred embodiments, an edge of the upper cover may be connected to the stove body in a riveted manner, and the pre-heating pipe has a ring of flange riveted to an edge of the through hole through the upper cover.

In some preferred embodiments, for the sake of convenient cleaning and maintenance, the stove body may be provided with a buckle, and the upper cover has an edge allowing the buckle to be fastened thereon and may be connected to the stove body through the buckle.

In some preferred embodiments, a sealing ring may be arranged between the stove body and the upper cover.

In some preferred embodiments, further may include a flame intensity adjustment cover, the flame intensity adjustment cover adjusts the flame intensity of the pressure-type alcohol stove in cooperation with the upper cover, wherein the flame intensity adjustment cover may include a cover body and a flame distribution plate, a first flame hole may be formed through the cover body and can be gradually shielded or unshielded by means of a relative movement of the flame distribution plate and the cover body;

In some preferred embodiments, the flame distribution plate may be connected with the cover body through a rotary part, the rotary part may be arranged at a center axis of the flame distribution plate and the cover body, and the cover body may be rotatably arranged on the cover body around the rotary part.

In some preferred embodiments, a second flame hole formed through the cover body may be identical to the first flame hole in shape and size.

In some preferred embodiments, the flame distribution plate further may include a handle, a fastener used for installing the handle may be arranged at an edge of the flame distribution plate.

When the alcohol stove is used, alcohol is added into the stove body of the alcohol stove via the filling port, the alcohol level between the high and low level scale lines is observed via the observation window, the alcohol is added into the pre-heating cavity at the top and is ignited to heat the pre-heating pipe at the center, the pre-heating pipe transfers heat to the alcohol in the stove body of the alcohol stove to accelerate the volatilization of the alcohol in the stove body, alcohol steam is sprayed out of the spray holes at the top to form a whirlwind of air so as to make a frame rise spirally, the pre-heating pipe is continuously heated, and the whole process is continuously circulated, so that the volatilization of the alcohol in the stove body is continuously accelerated after the stove is fully pre-heated. The air enters the stove body via the air jet holes formed in the pre-heating pipe to form a positive pressure environment in the stove body to accelerate an air spray of the spray holes, so that the spiral flame and the air are pre-mixed more fully, and the power is higher. Compared with traditional alcohol stoves, the alcohol stove of this invention has higher power and efficiency.

Compared with the prior art, the invention has the following beneficial effects:

1. An appropriate amount of alcohol is injected into a recess at the top and the stove body, the alcohol in the pre-heating cavity is ignited to heat the pre-heating pipe, the pre-heating pipe transfers the heat to the alcohol in the stove body of the alcohol stove to accelerate the volatilization of the alcohol in the stove body, the alcohol steam is sprayed out of the spray holes at the top to form a whirlwind of air so as to make the flame rise spirally, the pre-heating pipe is continuously heated, and the whole process is continuously circulated, so that the volatilization of the alcohol in the stove body is continuously accelerated after the stove is fully pre-heated. The air enters the stove body via the air jet holes formed in the pre-heating pipe to form the positive pressure environment in the stove body to accelerate the air spray of the spray holes, so that the spiral flame and the air are pre-mixed more fully, and the power is higher. Compared with the traditional alcohol stove, the alcohol stove of the invention has higher power and efficiency.

2. The alcohol stove of the invention is compact in structure, easy to assemble, convenient to carry, and can be used outdoors more conveniently.

DETAILED DESCRIPTION OF THE INVENTION

The technical solutions of the embodiments of the invention are clearly and completely described below in combination with the accompanying drawings. Clearly, the embodiments in the following description are only illustrative ones, and are not all possible ones of the invention. On the basis of the embodiments in the invention, all other embodiments obtained by those ordinarily skilled in the art without creative labor should also fall within the protection scope of the invention.

It can be understood that in the description of the invention, the directional or positional relations indicated by terms such as "upper", "lower", "front", "rear", "left", "right", "top", "bottom", "internal", and "external" are based on directional or positional relations shown in the accompanying drawings. These terms are only used for facilitating and simplifying the description of the invention, and do not indicate or imply that devices or elements referred to must have specific directions or must be formed and operated in specific directions, and these terms should not to be appreciated as limitations of the invention.

Figure 1:
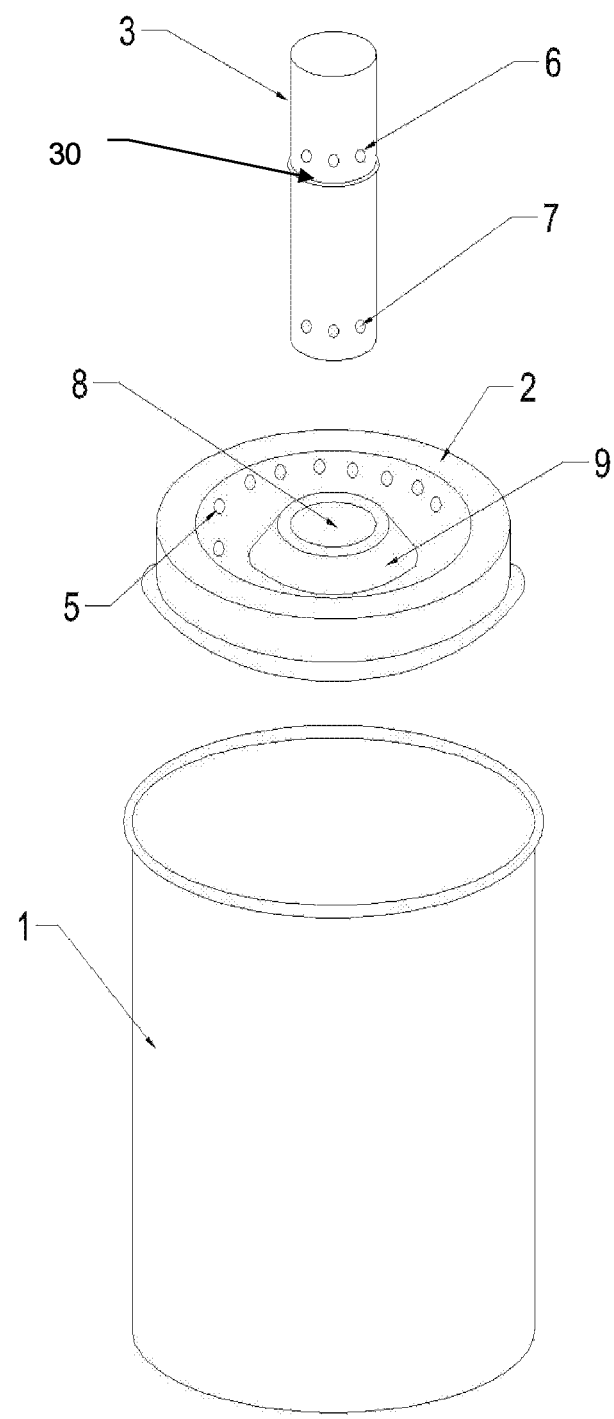
FIG. 1 is a structural view of a pressure-type alcohol stove of an embodiment of the invention.
Figure 2:
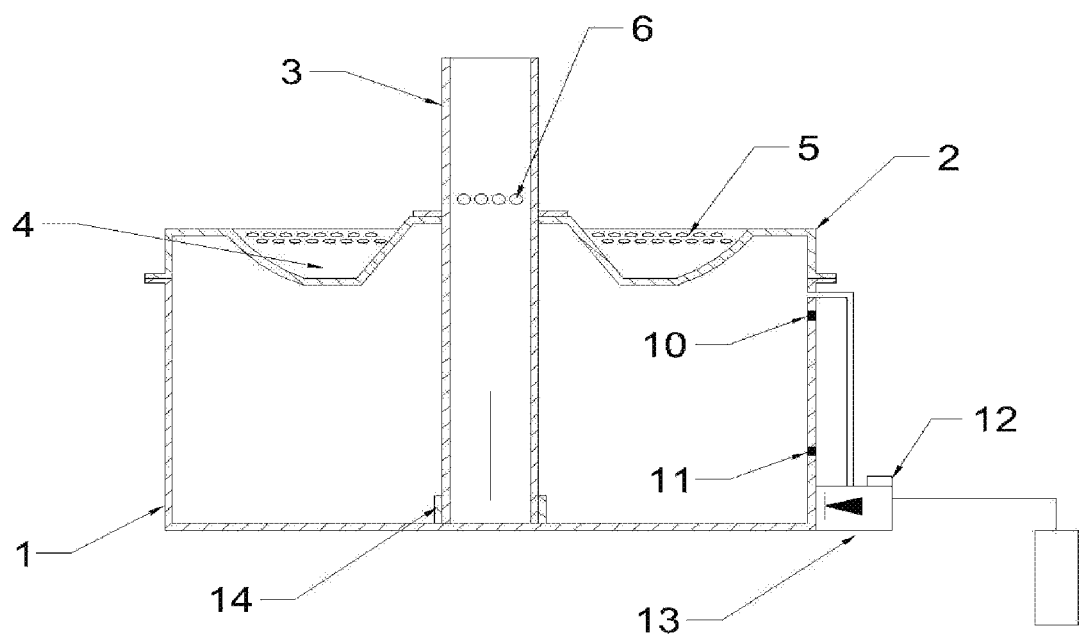
FIG. 2 is a sectional structural view of the pressure-type alcohol stove of an embodiment of the invention.
Figure 3:
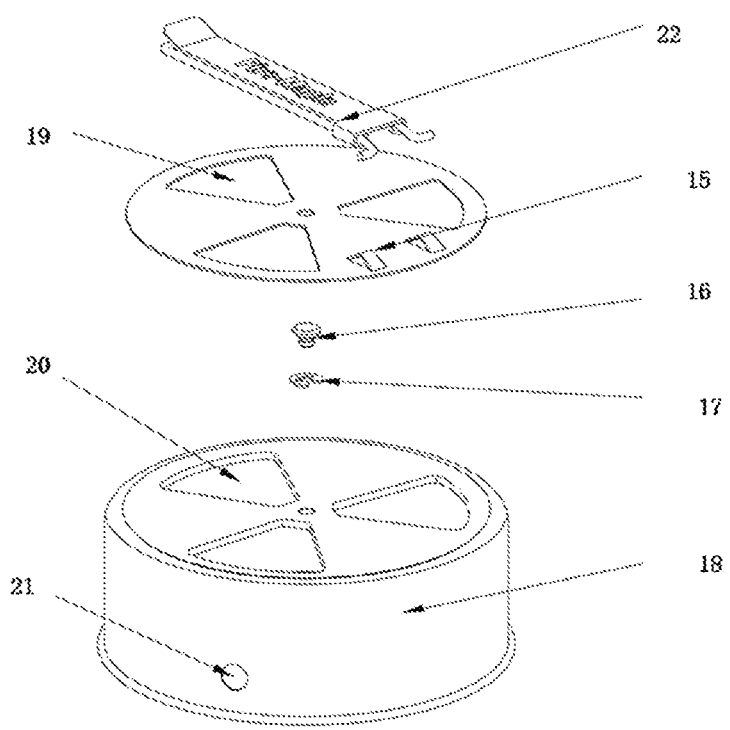
FIG. 3 is a schematic diagram of a flame intensity adjustment cover.

As shown in FIG. 1 to FIG. 3, the technical solution provided by an embodiment of the invention is as follows:

A pressure-type alcohol stove comprises a stove body 1, an upper cover 2, a pre-heating pipe 3, and an automatic liquid-feeding device, wherein the upper cover 2 is arranged on the stove body 1 and is matched with the stove body 1 to form a vaporization cavity, the pre-heating pipe 3 penetrates through the upper cover 2 and has a bottom end located in the stove body 1 and a top end partially stretching out of the upper cover 2, a pre-heating cavity 4 is formed around the pre-heating pipe 3, spirally-distributed spray holes 5 are formed through the upper cover 2, air jet holes 6 used for air jetting and pre-mixing are formed through an upper part of in the pre-heating pipe 3, alcohol guide holes 7 are formed in a lower part of the pre-heating pipe 3, and the number of the air jet holes 6 and alcohol guide holes 7 is at least one.

In some preferred embodiments, the automatic liquid-feeding device comprises two liquid level sensors 10 and 11, a controller 12, and an alcohol pump 13, wherein the two liquid level sensors 10 and 11 are vertically arranged on a side wall of the stove body with one above the other, the alcohol pump 13 has a liquid inlet communicated with an alcohol bottle via a pipe, the alcohol pump has a liquid outlet communicated with a liquid inlet at the side wall of the stove body via a pipe, and the controller 12 is electrically connected to the two liquid level sensors 10 and 11 and the alcohol pump 13; the liquid level sensors transmit liquid level information to the controller which controls the alcohol pump to be started when the liquid level is low and controls the alcohol pump to be stopped when the liquid level is maximized, so that automatic liquid feeding of the alcohol stove is fulfilled, and the intelligent effect of the alcohol stove is improved.

In some preferred embodiments, the two liquid level sensors 10 and 11 form high and low liquid level sensors used for inducing the alcohol level in the alcohol stove. When the alcohol level in the alcohol stove is lower than the lowest level, a low liquid level sensor sends a signal to the controller 12, and the alcohol pump 13 is controlled by the controller 12 to be started through an electromagnetic relay to pump alcohol from the alcohol bottle into the alcohol stove; and when the alcohol level in the alcohol stove is maximized, the high liquid level sensor sends a signal to the controller 12, and the pump alcohol 13 is controlled by the controller 12 to stop pumping the alcohol.

In some preferred embodiments, air jet holes are arranged along a circumferential direction of the preheating pipe, and at least one circle of air jet holes 6 are circumferentially formed through the pre-heating pipe 3.

In some preferred embodiments, the middle of the upper cover 2 is recessed downward to form the pre-heating cavity 4 used for containing alcohol.

In some preferred embodiments, a center of the upper cover 2 protrudes upwards to be higher than the surface of the upper cover 2 and to form a lug boss 9, a center of a top of the lug boss 9 is provided with a through hole 8, the lower end of the pre-heating pipe 3 penetrates through the through hole 8 to be fixedly connected to a bottom of the stove body 1, and the lug boss 9 and a central recessed surface of the upper cover 2 form the pre-heating cavity 4.

In some preferred embodiments, the air jet holes 6 are formed through the pre-heating pipe 3 stretching out of the lug boss 9.

In some preferred embodiments, a protruding ferrule 14 is arranged at a position, corresponding to the pre-heating pipe, of a bottom of the stove body to fix the lower end of the pre-heating pipe.

In some preferred embodiments, the pre-heating cavity 4 is not limited to be annular, and may be polygonal, thus being convenient to use.

In some preferred embodiments, to avoid spilling the alcohol into the pre-heating cavity 4, a top of the lug boss 9 is higher than the highest external upper surface of the upper cover 2.

In some preferred embodiments, at least one spray hole 5 is formed through an external side wall of the pre-heating cavity 4 and is close to the upper surface of the upper cover 2.

In some preferred embodiments, a circle of spray holes 5 are circumferentially formed through an external side wall of the pre-heating cavity 4 at equal intervals, openings of each of the spray holes 5 all face the pre-heating pipe 3 arranged at the center, and the spray holes 5 have an angle which is 8°-15° and preferably is 10° in the horizontal direction to spray whirlwind air, so that the using effect of the alcohol stove is improved.

In some preferred embodiments, a plurality of circles of spray holes 5 are circumferentially formed through an external side wall of the pre-heating cavity 4 at equal intervals, and every two adjacent circles of spray holes are staggered.

In some preferred embodiments, the stove body 1 of the alcohol stove is provided with a handle sleeved with a heat insulation sleeve, so that the alcohol stove can be conveniently carried by users.

In some preferred embodiments, a transparent observation window is arranged in the wall of the stove body 1 of the alcohol stove, so that the alcohol level in the stove body 1 can be conveniently observed from the outside.

In some preferred embodiments, an alcohol filling port is formed in the wall of the stove body 1 of the alcohol stove and is communicated with a filling pipe which has a top higher than that of the stove body 1 of the alcohol stove.

In some preferred embodiments, a cover plate is arranged at the top of the filling pipe.

In some preferred embodiments, the cover plate is movably connected to the top of the filling pipe through a hinge pin structure, and such structure facilitates the opening and closing of the cover plate.

In some preferred embodiments, the cover plate is made from rubber and has a shroud ring segment disposed at the top opening of the filling pipe, and such structure has good airtightness.

In some preferred embodiments, the stove body 1 and the upper cover 2 are made of stainless steel, glass, or aluminum alloys, and the pre-heating pipe 3 is made of stainless steel, aluminum alloys, copper, or copper alloys.

In some preferred embodiments, an edge of the upper cover 2 is connected to the stove body 1 in a riveted manner, and the pre-heating pipe 3 has a ring of flange 30 riveted to an edge of the through hole 8 through the upper cover 2.

In some preferred embodiments, for the sake of convenient cleaning and maintenance, the stove body 1 is provided with a buckle, and the upper cover 2 has an edge allowing the buckle to be fastened thereon and is connected to the stove body 1 through the buckle.

In some preferred embodiments, a sealing ring is arranged between the stove body 1 and the upper cover 2 and is made from silicone rubber, nitrile rubber, or natural rubber. The rubber has outstanding corrosion resistance and excellent resilience, insulation, water resistance and plasticity, and also has the important properties of oil resistance, heat resistance, pressure resistance, and abrasion resistance after being processed, so that the service life of the alcohol stove is prolonged.

In some preferred embodiments, the pressure-type alcohol stove is further provided with a flame intensity adjustment cover which adjusts the flame intensity of the pressure-type alcohol stove in cooperation with the upper cover 2 and forms a relatively sealed cavity after being matched with the upper cover 2. The flame intensity adjustment cover includes a cover body 18 and a flame distribution plate 15, wherein first flame holes 20 are formed through the cover body 18 and are gradually shielded or unshielded by means of a relative movement of the flame distribution plate 15 and the cover body 18; the flame holes 20 are through holes via which the cavity is communicated with the outside, and the oxygen content of the cavity can be controlled through an adjustment on the size of the first flame holes 20, so that the flame intensity can be controlled. The flame distribution plate 15 is connected with the cover body 18 through a rotary part arranged at the center axis of the flame distribution plate 15 and the cover body 18 and is rotatably arranged on the cover body 18 around the rotary part. The rotary part includes a fixed pin 16 and a clamp spring 17. Second flame holes 19 formed in the cover body 18 are identical to the first flame holes 20 in shape and size. The flame intensity adjustment cover further includes a handle 22, wherein a fastener used for installing the handle 22 is arranged at the edge of the flame distribution plate 15. The handle 22 is configured to facilitate the rotation of the flame distribution plate 15, and is arranged at the edge, thus having large torque. An air hole is formed in the edge of the cover body 18 to make sure that the cavity is communicated with the outside, so that the situation that the flame intensity adjustment cover cannot be separated from the upper cover under the external atmospheric pressure after the oxygen in the cavity is fully burned is prevented.

When the alcohol stove is used, alcohol is added into the stove body 1 of the alcohol stove via the filling port, the alcohol level between the high and low level scale lines is observed via the observation window, the alcohol is added into the pre-heating cavity 4 at the top and is ignited to heat the pre-heating pipe 3 at the center, the pre-heating pipe 3 transfers heat to the alcohol in the stove body 1 of the alcohol stove to accelerate the volatilization of the alcohol in the stove body 1, alcohol steam is sprayed out of the spray holes 5 at the top to form a whirlwind of air so as to make a frame rise spirally, the pre-heating pipe 3 is continuously heated, and the whole process is continuously circulated, so that the volatilization of the alcohol in the stove body 1 is continuously accelerated after the stove is fully pre-heated. The air enters the stove body 1 via the air jet holes 6 formed in the pre-heating pipe 3 to form a positive pressure environment in the stove body 1 to accelerate an air spray of the spray holes 5, so that the spiral flame and the air are pre-mixed more fully, and the power is higher. Compared with traditional alcohol stoves, the alcohol stove of this invention has higher power and efficiency.

Compared with the prior art, the invention has the following beneficial effects:

1. An appropriate amount of alcohol is injected into a recess at the top and the stove body, the alcohol in the pre-heating cavity is ignited to heat the pre-heating pipe, the pre-heating pipe transfers the heat to the alcohol in the stove body of the alcohol stove to accelerate the volatilization of the alcohol in the stove body, the alcohol steam is sprayed out of the spray holes at the top to form a whirlwind of air so as to make the flame rise spirally, the pre-heating pipe is continuously heated, and the whole process is continuously circulated, so that the volatilization of the alcohol in the stove body is continuously accelerated after the stove is fully pre-heated. The air enters the stove body via the air jet holes formed in the pre-heating pipe to form the positive pressure environment in the stove body to accelerate the air spray of the spray holes, so that the spiral flame and the air are pre-mixed more fully, and the power is higher. Compared with the traditional alcohol stove, the alcohol stove of the invention has higher power and efficiency. 2. The alcohol stove of the invention is compact in structure, easy to assemble, convenient to carry, and can be used outdoors more conveniently.

Although the embodiments of the invention are shown and described, those ordinarily skilled in the art can make various changes, modifications, replacements, and deformations to these embodiments without deviating from the principle and spirit of the invention. The scope of the invention is limited by the appended claims and their equivalents.

What is claimed is:

1. A pressure-type alcohol stove, comprising a stove body, an upper cover, a pre-heating pipe and an automatic liquid-feeding device, wherein the upper cover is arranged on the stove body and is matched with the stove body to form a vaporization cavity, the pre-heating pipe penetrates through the upper cover, the pre-heating pipe has a bottom end located in the stove body and a top end partially stretching out of the upper cover, a pre-heating cavity is formed around the pre-heating pipe, spirally-distributed spray holes are formed through the upper cover, air jet holes used for air jetting and pre-mixing are formed through an upper part of the pre-heating pipe, alcohol guide holes are formed in a lower part of the pre-heating pipe;

wherein the automatic liquid-feeding device comprises two liquid level sensors, a controller, and an alcohol pump, wherein the two liquid level sensors are vertically arranged on a side wall of the stove body with one above the other, the alcohol pump has a liquid inlet communicated with an alcohol bottle via a pipe, the alcohol pump has a liquid outlet communicated with a liquid inlet at the side wall of the stove body via a pipe, and the controller is electrically connected to the two liquid level sensors and the alcohol pump.

2. The pressure-type alcohol stove according to claim 1, wherein a center of the upper cover protrudes upwards to be higher than a surface of the upper cover and to form a lug boss, a center of a top of the lug boss is provided with a through hole, the lower end of the pre-heating pipe penetrates through the through hole to be fixedly connected to a bottom of the stove body.

3. The pressure-type alcohol stove according to claim 2, wherein the lug boss and a central recessed surface of the upper cover together form the pre-heating cavity.

4. The pressure-type alcohol stove according to claim 3, wherein the air jet holes are formed through the pre-heating pipe stretching out of the lug boss.

5. The pressure-type alcohol stove according to claim 2, wherein a top of the lug boss is higher than the highest external upper surface of the upper cover.

6. The pressure-type alcohol stove according to claim 1, wherein an edge of the upper cover is connected with the stove body in a riveted manner, and the pre-heating pipe has a ring of flange riveted to an edge of the through hole through the upper cover.

7. The pressure-type alcohol stove according to claim 1, wherein the stove body and the upper cover are made of stainless steel, glass, or aluminum alloys, and the pre-heating pipe is made of stainless steel, aluminum alloys, copper, or copper alloys.

8. The pressure-type alcohol stove according to claim 1, wherein the air jet holes are arranged along a circumferential direction of the preheating pipe, and at least one circle of air jet holes is circumferentially formed through the pre-heating pipe.

9. The pressure-type alcohol stove according to claim 1, wherein a circle of spray holes are circumferentially formed through an external side wall of the pre-heating cavity at equal intervals, openings of each of the spray holes all face toward the pre-heating pipe arranged at the center, the spray holes have an angle in a horizontal direction, and each of the angles is 8°-15°.

10. The pressure-type alcohol stove according to claim 1, a plurality of circles of spray holes are circumferentially formed through an external side wall of the pre-heating cavity at equal intervals, and every two adjacent circles of spray holes are staggered.

11. The pressure-type alcohol stove according to claim 1, wherein the pressure-type alcohol stove further comprises a flame intensity adjustment cover, the flame intensity adjustment cover adjusts the flame intensity of the pressure-type alcohol stove in cooperation with the upper cover, wherein the flame intensity adjustment cover comprises a cover body and a flame distribution plate, a first flame hole is formed through the cover body and can be gradually shielded or unshielded by means of a relative movement of the flame distribution plate and the cover body.

12. The pressure-type alcohol stove according to claim 11, wherein the flame distribution plate is connected with the cover body through a rotary part, the rotary part is arranged at a center axis of the flame distribution plate and the cover body, and the cover body is rotatably arranged on the cover body around the rotary part.

13. The pressure-type alcohol stove according to claim 11, wherein a second flame hole formed through the cover body is identical to the first flame hole in shape and size.

14. The pressure-type alcohol stove according to claim 11, wherein the flame distribution plate further comprises a handle, a fastener used for installing the handle is arranged at an edge of the flame distribution plate.

* * * * *